Figure 1:
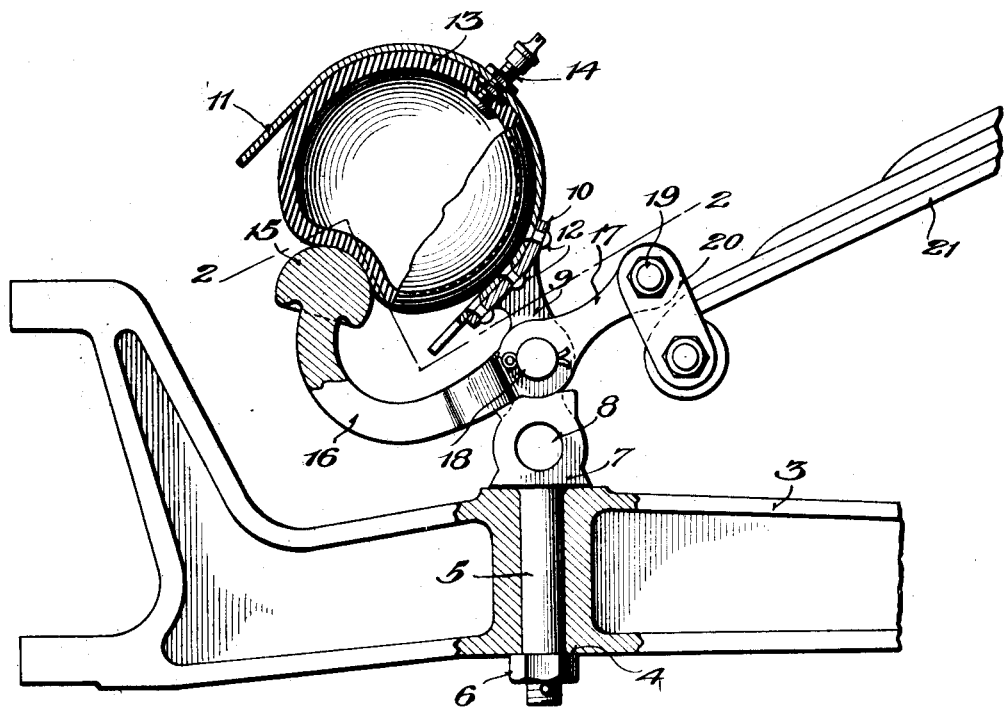

L. I. THOMPSON.
VEHICLE SPRING.
APPLICATION FILED JULY 22, 1920.

1,379,321.

Patented May 24, 1921.

Inventor
Lewis Irvine Thompson,
By Royal E. Burnham,
Attorney

WITNESS:—
Chas. R. Griesbauer

UNITED STATES PATENT OFFICE.

LEWIS IRVINE THOMPSON, OF PORTLAND, OREGON.

VEHICLE-SPRING.

1,379,321. Specification of Letters Patent. Patented May 24, 1921.

Application filed July 22, 1920. Serial No. 398,055.

*To all whom it may concern:*

Be it known that I, LEWIS IRVINE THOMPSON, a citizen of the United States, residing at Portland, in the county of Multnomah and State of Oregon, have invented certain new and useful Improvements in Vehicle-Springs, of which the following is a specification, reference being had therein to the accompanying drawing.

This invention relates to a vehicle-spring device that includes a pneumatic cushioning element that receives and absorbs stresses, shocks, vibrations, and the like resulting from irregularities in the roadway over which a vehicle equipped therewith may be proceeding.

It is an object of the invention so to form the device that it will occupy little space, be effective for the purposes for which it is intended, can be installed easily on vehicles now in service without material or costly alteration of any of its parts, and can be produced at comparatively small cost.

When read in connection with the description herein, the details and characteristics of the invention will be apparent from the accompanying drawing, forming part hereof, wherein an embodiment of the invention as applied to a small type of motor-vehicle is disclosed, for purposes of illustration.

While the disclosures herein exemplify what now is considered to be a preferable embodiment of the invention, it is to be understood that it is not the intention to be limited necessarily thereto in interpretation of claims, as modifications and adaptations within the limits of the claims can be made without departing from the nature of the invention.

Like reference-characters refer to corresponding parts in the views of the drawing, of which—

Figure 2:
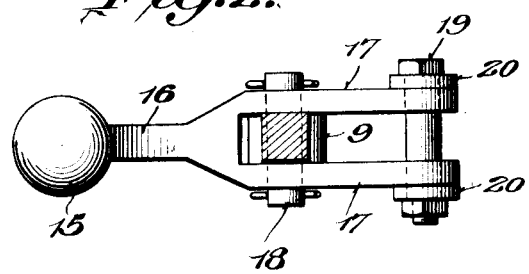

Figure 1 is a side elevation, in which is shown a portion of an axle and one of the spring devices mounted thereon near one end, it being understood that a similar device may be mounted in a similar manner near both ends of either or both axles of a vehicle; and Fig. 2 is a plan view, partly in section on the line 2—2.

Having more particular reference to the drawing, 3 designates an axle, having near each end a substantially vertical hole or passageway 4 such as commonly existent in such parts for reception of means of connection for other elements of the vehicle.

For the purpose of carrying the movable parts of the device, there is provided a bracket or standard that includes a bolt-shank 5, which is disposed, when the device is in place, in a hole in the axle such as illustrated. The shank is sufficiently long for one end (normally the lower) to extend beyond the axle, and that end is screw threaded and has thereon a nut 6 arranged to draw against the opposite face of the axle an enlarged intermediate portion 7, whereby the bracket is held firmly in place. The intermediate portion, which constitutes a head of the bolt-shank, has a seat or passageway 8 arranged to be engaged by a rod or other suitable article to prevent the shank from turning while the nut is being tightened.

An arm 9, substantially coaxial with the shank 5, extends from the intermediate portion of the bracket, and it has at its free end an enlarged head 10, which affords an outer end surface that is inclined with respect to the axis of the bracket.

Preferably the shank, intermediate portion, arm, and head of the arm are formed of a single piece of metal, and thus there is provided a unitary fitting that is easily associated with and disassociated from an axle.

A curved, open-ended, member 11, preferably of strong sheet metal, is held on the head 10 and against the inclined outer surface thereof by rivets or other suitable fasteners 12. The member 11 has therein, and constitutes a housing for, a substantially spherical hollow casing 13, which is formed of strong laminated or other suitable fabric that is resilient, and is impervious to passage of air therethrough. A nipple 14, containing a valve-controlled passage in communication with the interior of the casing, affords means whereby air pressure therein may be varied to suit varying loads and other requirements of service.

A substantially semi-spherical or otherwise rounded head 15 bears against the casing 13, which affords an air-sustained diaphragm that is resistent to pressure of the head. The head is the terminal portion of an arm 16 that curves toward the casing and is a part of a lever. The opposite end portion of the lever is formed of two substantially parallel legs 17, which straddle the arm 9 of the bracket, and the lever is fulcrumed intermediately of its ends on a removable pin or bolt 18 disposed through the arm and legs. The free end portions of the legs carry a pin or bolt 19, which connect thereto shackle members 20 that in turn are connected with a leaf-spring 21 arranged to sustain load and impose it on the axle, the leaf-spring or other member being connected with the body or other load-carrying portion of the vehicle.

In a vehicle equipped as described with spring devices, the weight of the load is imposed on the axle through the levers, the free ends of which bear against the air-inflated casings. Sufficient air pressure is maintained in those casings to prevent destructive deformation thereof by unusual shocks and stresses, and that pressure is maintained at such a degree that the casings will be sufficiently sensitive to be adequately absorptive of shocks, stresses, and vibration. To meet changing loads and varying conditions of roadway, the air pressure in the casings may be altered, of course, by use of the valve-controlled passages of the nipples 14.

If it is found that under certain conditions the reciprocal relation of the parts cannot be maintained satisfactorily by alteration of air pressure in the casings 13, the fulcrum-pin 18 may be shifted to the passageway 8 and thus the fulcrum of the lever changed with respect to the casings. In such case, the connection of the levers and the leaf-springs would be rearranged to prevent that spring from contacting with the axle.

It will be seen that a spring device formed and mounted in the manner described affords adjustably-sensitive, simple, and efficient means, interposed between the axle and its load, that will absorb a large part of the vibration, shocks, stresses, and the like, occurring in the axle during the running of a vehicle that are not taken up by the leaf or other metallic springs ordinarily employed, and prevent communication thereof to the body or other load-containing portion of the vehicle.

Having thus described my invention, what I claim as new, and desire to secure by Letters Patent, is—

1. A spring device comprising a support, a fluid-sustained resilient member mounted thereon, a lever including an arm curving toward said member having a terminal arranged to contact therewith and oppositely-extending legs straddling said support arranged to be connected with an element causing said arm to bear against said member, and a pivot member disposed through said support and legs.

2. A spring device comprising a unitary substantially coaxial fitting including a securing-shank and an arm, a fluid-sustained resilient member mounted on said arm, and a lever fulcrumed on said arm arranged to contact at one end with said member and arranged to be connected in its other end portion with an element causing the lever to bear against said member.

3. In a vehicle, the combination, with an axle and an element arranged to impose load thereon, of a spring device comprising a support attached to the axle, a fluid-sustained resilient member on said support, and a lever fulcrumed intermediately of its ends on said support, said lever including an arm curving toward said member having a terminal in contact therewith and an oppositely-extending portion connected with said element.

4. In a vehicle, the combination, with an axle and an element arranged to impose load thereon, of a spring device comprising a support, a fluid-sustained resilient member mounted on said support, a lever including an arm curving toward said member having a terminal in contact therewith and oppositely-extending legs straddling said support connected with said element, and a pivot-member disposed through said support and legs.

5. In a vehicle, the combination, with an axle having a hole therein and an element arranged to impose load thereon, of a spring device comprising a unitary substantially coaxial fitting including a securing-shank secured in said axle-hole and an arm, a fluid-sustained resilient member on said arm, and a lever fulcrumed on said arm in contact at one end with said member and connected in its other end portion with said element.

6. A spring device comprising a support having a shank arranged to be connected in an axle of a vehicle and an arm extending therefrom formed with an enlarged head, a housing on said head, a fluid-inflated resilient casing in said housing, and a lever fulcrumed on said support, said lever on one side of the fulcrum having a terminal arranged to bear against said casing and being arranged on the opposite side of the fulcrum for connection with a load-sustaining member of the vehicle.

7. A spring device comprising a support having a shank arranged to be connected in an axle of a vehicle and an arm substantially coaxial with said shank formed with an enlarged head, a housing on said head, a fluid-inflated resilient casing in said housing, and a lever fulcrumed on said support, said lever having a terminal arranged to bear against said casing and being arranged on the opposite side of the fulcrum for connection with a load-sustaining member of the vehicle.

In testimony whereof I affix my signature.

LEWIS IRVINE THOMPSON.